United States Patent [19]

Kidokoro

[11] Patent Number: 5,596,971
[45] Date of Patent: Jan. 28, 1997

[54] FUEL STORING DEVICE FOR MOTOR VEHICLE

[75] Inventor: Toru Kidokoro, Hadano, Japan

[73] Assignee: Toyota Jidosha Kabushiki Kaisha, Aichi, Japan

[21] Appl. No.: 545,066

[22] Filed: Oct. 19, 1995

[30] Foreign Application Priority Data

| Oct. 21, 1994 | [JP] | Japan | 6-256813 |
| Jan. 24, 1995 | [JP] | Japan | 7-008979 |
| Sep. 8, 1995 | [JP] | Japan | 7-231242 |

[51] Int. Cl.$^6$ .................................... F02M 33/02
[52] U.S. Cl. .............................. 123/516; 123/518
[58] Field of Search ....................... 123/516, 518, 123/519, 520; 220/4.14, 905

[56] References Cited

U.S. PATENT DOCUMENTS

| 3,617,034 | 11/1971 | Skinner | 261/22 |
| 3,949,720 | 4/1976 | Zipprich et al. | 123/518 |
| 3,977,379 | 8/1976 | Weissenbach | 123/518 |
| 5,056,493 | 10/1991 | Holzer | 123/518 |
| 5,460,135 | 10/1995 | Ohashi et al. | 123/518 |

FOREIGN PATENT DOCUMENTS

| 60-158922 | 10/1985 | Japan. |
| 64-60424A | 3/1989 | Japan. |

*Primary Examiner*—Thomas N. Moulis
*Attorney, Agent, or Firm*—Kenyon & Kenyon

[57] ABSTRACT

A fuel storing device comprising a fuel storage container having therein a fuel storage portion which is enclosed by a stretchable film and can expand and contract. An atmospheric pressure relief valve which opens when the pressure of the space portion formed in the fuel storage container around the fuel storage portion starts to fall below atmospheric pressure and a positive pressure relief valve which opens when the pressure of the space portion exceeds a certain positive pressure higher than the atmospheric pressure are provided between the space portion and the outside air so as to maintain the pressure of the space portion at least at atmospheric pressure at all times.

18 Claims, 4 Drawing Sheets

FUEL STORING DEVICE FOR MOTOR VEHICLE

BACKGROUND OF THE INVENTION

1. Field of the Invention

The present invention relates to a fuel storing device for a motor vehicle.

2. Description of the Related Art

Known in the art is an internal combustion engine which prevents the discharge into the outside air of the fuel vapor produced in a fuel tank when refueling by leading the fuel vapor in the fuel tank into a charcoal canister at the time of refueling so as to cause it to be adsorbed in the charcoal canister. In this case, if there is too much of an amount of fuel vapor produced in the fuel tank at the time of refueling, it is necessary to make the charcoal canister larger in volume. To make the charcoal canister smaller in size, it is necessary to reduce the amount of the fuel vapor produced in the fuel tank as much as possible.

However, when fuel sits in the fuel tank, the upper space in the fuel tank becomes filled with fuel vapor. Accordingly, to reduce the amount of the fuel vapor produced in the fuel tank, it becomes necessary to reduce the volume of the upper space in the fuel tank as much as possible. Known in the art is a fuel tank wherein, to reduce the volume of the upper space of the fuel tank, a separating film contacting the surface of the liquid fuel in the fuel tank and moving up and down with the surface of the liquid fuel is disposed in the fuel tank and a plate serving as a weight is placed on the separating film (see Japanese Utility Model Publication (Kokai) No. 60-158922).

If a weight is used in this way, however, not only is there the problem of the fuel tank becoming heavier, but also there is the problem that the construction of the fuel tank becomes complicated, so time is taken for fabricating the fuel tank.

SUMMARY OF THE INVENTION

An object of the present invention is to provide a fuel storing device capable of reducing the amount of fuel vapor produced therein.

According to the present invention, there is provided a fuel storing device for a motor vehicle comprising: a fuel storing container; a pliable stretchable film disposed in said fuel storage container and separating the inside of said fuel storage container into a fuel storage portion and a space portion; a refuel pipe connected to said fuel storage portion; and pressure regulating means able to hold the pressure of the space portion at a pressure higher than atmospheric pressure.

The present invention may be more fully understood from the description of the preferred embodiments of the invention set forth below, together with the accompanying drawings.

DESCRIPTION OF THE PREFERRED EMBODIMENTS

Figure 1:
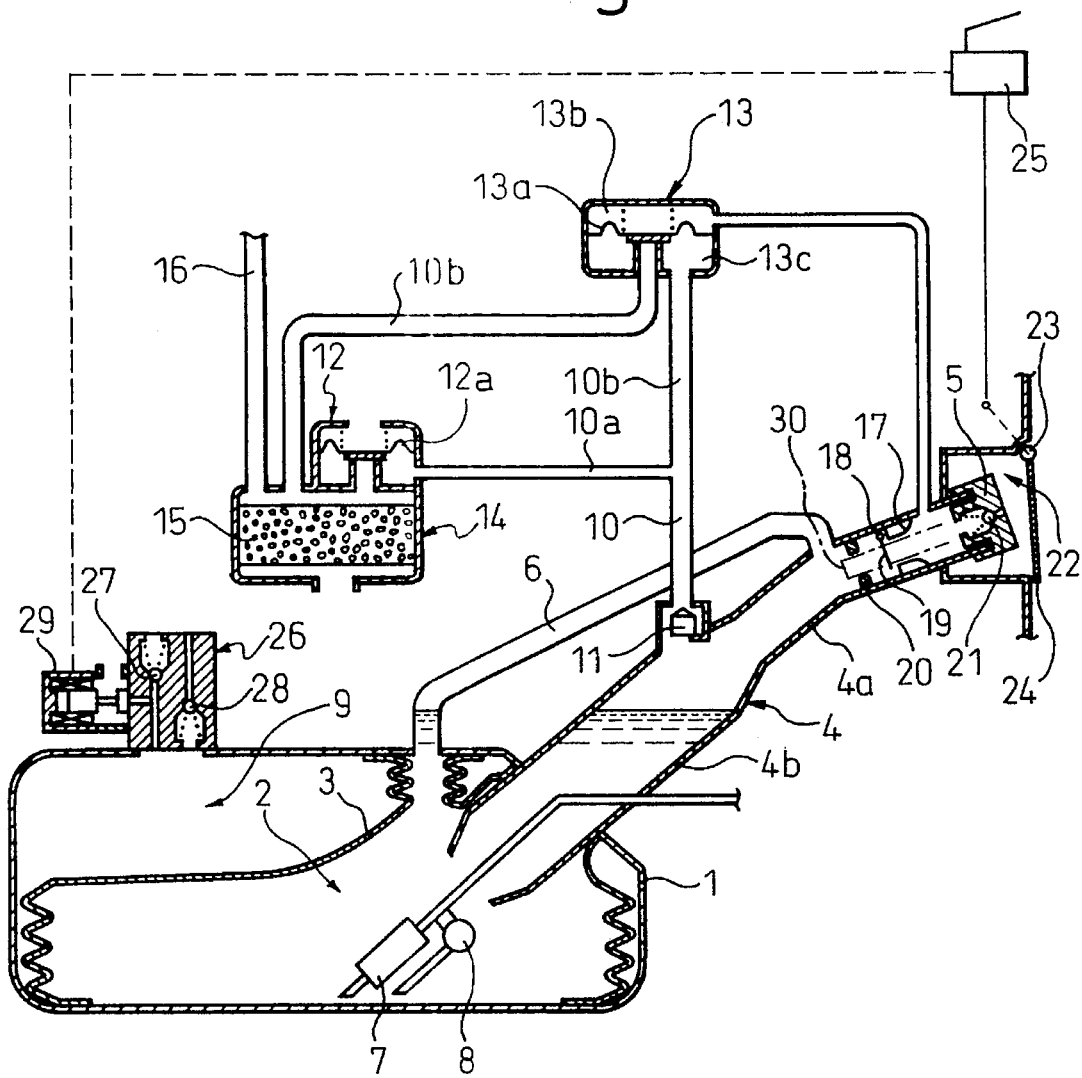
FIG. 1 is a general view of an embodiment of a fuel storing device.

Referring to FIG. 1, reference numeral 1 is a fuel storage container of a hermetic construction comprised of a metal or plastic material, 2 is an expandable and contractible fuel storage portion surrounded by a bag-shaped stretchable film 3 comprised of a flexible material such as rubber, 4 is a refueling pipe hermetically affixed to the fuel storage container 1 and projecting outward from the fuel storage container 1, 5 is a fuel cap detachably attached to the front end of the refueling pipe 4, 6 is a breather sleeve extending from the surface of the top wall of the fuel storage container 1 to the top region inside the refueling pipe 4, 7 is a fuel pump for sending out fuel in the fuel storage portion 2, and 8 is a pressure regulator for regulating the pressure of the fuel sent out from the fuel pump 7.

As shown in FIG. 1, the bottom end of the refueling pipe 4 opens inside the fuel storage portion 2. The stretchable film 3 is affixed in a sealed manner on the outer circumference of the refueling pipe 4. The top end of the stretchable film 3 is fixed in a sealed manner on the inner circumference of the fuel storage container 1 around the opening at the bottom end of the breather pipe 6 so that the fuel vapor produced in the fuel storage portion 2 is sent inside the upper region of the refueling pipe 4 through the breather pipe 6. Further, the bottom end of the stretchable film 3 is affixed in a sealed manner on the bottom wall of the fuel storage container 1. Accordingly, the fuel storage portion 2 is completely separated from the space portion 9, formed inside the fuel storage container 1 around the fuel storage portion 2, by the stretchable film 3.

The refueling pipe 4 is comprised of a small diameter upper portion 4a and a large diameter lower portion 4b. A vapor exhaust passage 10 extends upward from the large diameter portion 4b of the refueling pipe 4. At the connection of the vapor exhaust passage 10 and the large diameter lower portion 4b of the refueling pipe 4, an anti-overfueling valve 11 comprised of a float valve is disposed so as to prevent the flow of the fuel into the vapor exhaust passage 10. The anti-overfueling valve 11 is usually open as shown in FIG. 1, but closes when the surface of the liquid fuel rises to the height of the anti-overfueling valve 11 and thereby prevents the fuel from flowing into the vapor exhaust passage 10.

The vapor exhaust passage 10 is split into a first vapor exhaust passage 10a and a second vapor exhaust passage 10b. The first vapor exhaust passage 10a is connected through an internal pressure control valve 12 controlling the internal pressure of the storage portion 2 to the charcoal canister 14, and the second vapor exhaust passage 10b is connected through a vapor exhaust passage control valve 13 to the charcoal canister 14. The charcoal canister 14 has an activated carbon layer 15 inside it. The fuel adsorbed in the activated carbon layer 15 is purged to the inside of the engine intake passage (not shown) through a fuel vapor purge passage 16 at the time of predetermined operating states of the engine. The internal pressure control valve 12 is provided with a diaphragm valve 12a which opens and closes in response to a pressure difference between the pressure in the fuel storage portion 2 and the atmospheric pressure. The internal pressure control valve 12 opens when the pressure difference between the pressure in the fuel storage portion 2 and the atmospheric pressure exceeds a predetermined differential pressure, that is, when the pressure in the fuel storage portion 2 exceeds a predetermined positive pressure higher than the atmospheric pressure.

In the small diameter upper portion 4a of the refueling pipe 4 is inserted a venturi-shaped guide member 17 for guiding the fuel nozzle. At the opening at the bottom end of the venturi-shaped guide member 17 is disposed a fuel vapor outflow cut-off valve 19 which is supported pivotally by a pivot pin 18 and usually closes the opening at the bottom end of the guide member 17. In the small diameter upper portion 4a of the refueling pipe 4 under the venturi-shaped guide member 17 is disposed a seal member 20 which contacts the outer circumference of the gas nozzle when the gas nozzle is inserted.

The vapor exhaust control valve 13 is provided at one side of the diaphragm valve 13a with an upper chamber 13b which is connected to the inside of the small diameter upper portion 4a of the refueling pipe 4 above the venturi-shaped guide member 17 and is provided at the other side of the diaphragm valve 13a with a lower chamber 13c connected to the inside of the fuel storage portion 2 through a second vapor exhaust passage 10b. The diaphragm valve 13a opens when the pressure difference between the pressure inside the upper chamber 13b and the pressure inside the lower chamber 13c exceeds a predetermined differential pressure, that is, when the pressure inside the lower chamber 13c becomes higher by a certain pressure than the pressure inside the upper chamber 13b. Note that the pressure difference between the inside of the upper chamber 13b and the inside of the lower chamber 13c when the vapor exhaust control valve 13 is opened is much smaller compared with the pressure difference between the pressure in the fuel storage portion 2 and the atmospheric pressure when the vapor exhaust control valve 13 opens.

Inside the fuel cap 5 is disposed an outside air introduction valve 21 which opens when the negative pressure in the fuel storage portion 2 becomes abnormally high. The outside air introduction valve 21 opens when the pressure inside the fuel storage portion 2 becomes lower than a predetermined negative pressure lower than the atmospheric pressure and causes the outside air to be introduced into the fuel storage portion 2. As shown in FIG. 1, the fuel cap 5 is disposed inside a recess 22 formed in the outside surface of the vehicle body. This recess 22 is normally covered by the fuel tank lid 24 which is pivotally supported by a pivot pin 23. This fuel tank lid 24 is connected to a fuel tank lid opener 25 which is provided at the driver's seat of the motor vehicle. The fuel tank lid 24 is opened and closed by operating the fuel tank lid opener 25.

Further, as shown in FIG. 1, a regulating apparatus 26 for controlling the pressure of the space portion 9 in the fuel storage container 1 is disposed on the top wall of the fuel storage container 1. This regulating apparatus 26 is provided with three valves disposed in parallel for controlling the communication between the space portion 9 in the fuel storage container 1 and the outside air, that is, a positive pressure relief valve 27 comprised of a check valve, an atmospheric pressure relief valve 28 comprised of a check valve, and an outside air opening valve 29 comprised of a solenoid valve.

The positive pressure relief valve 27 opens when the pressure inside the space portion 9 in the fuel storage container 1 exceeds a predetermined positive pressure higher than the atmospheric pressure. The opening pressure of the positive pressure relief valve 27 is set larger than the opening pressure of the internal pressure control valve 12. On the other hand, the atmospheric pressure relief valve 28 opens immediately when the pressure in the space portion 9 in the fuel storage container 1 becomes lower than the atmospheric pressure. The outside air opening valve 29 is controlled in accordance with the operation of the fuel tank lid opener 25. The outside air opening valve 29 is made to open when the fuel tank lid opener 25 is operated to open the fuel tank lid 24. Accordingly, the outside air opening valve 29 is held in the closed state at times other than refueling. At this time, the pressure in the space portion 9 in the fuel storage container 1 is held by the positive pressure relief valve 27 and the atmospheric pressure relief valve 28 to at least substantially the atmospheric pressure and a pressure lower than the opening pressure of the positive pressure relief valve 27.

When the fuel in the fuel storage portion 2 becomes lower, the fuel storage portion 2 in the stretchable film 3 contracts. When refueling, first, the fuel tank lid opener 25 is operated to cause the fuel tank lid 24 to open. When the fuel tank lid opener 25 is operated, the outside air opening valve 29 of the regulating apparatus 26 is made to open and therefore the pressure of the space portion 9 in the fuel storage container 1 becomes the atmospheric pressure. Next, the fuel cap 5 is removed to enable the fuel nozzle to be inserted into the refueling pipe 4. At this time, the opening at the bottom end of the venturi-shaped guide member 17 is closed by the fuel vapor outflow cut-off valve 19, accordingly at this time there is no discharge of fuel vapor in the fuel storage portion 2 to the outside air.

Next, the fuel nozzle is inserted into the guide member 17. At this time, the fuel vapor outflow cut-off valve 19 is made to open by the front end of the fuel nozzle. Next, the front end of the fuel nozzle is inserted in a sealed manner inside the seal member 20 as shown by the broken line in FIG. 1, then refueling begins. Since the fuel nozzle is inserted in a sealed manner into the seal member 20 in this way, there is no danger of the air passing around the fuel nozzle during refueling and mixing in with the fuel in the fuel storage container 2.

When refueling is started, the fuel in the fuel storage portion 2 increases and, along with that, the fuel storage portion 2 in the stretchable film 3 expands. At this time, the outside air opening valve 29 is open, so the fuel storage portion 2 in the stretchable film 3 can freely expand. On the other hand, when the refueling is started, the pressure in the fuel storage portion 2 rises. This rising pressure passes through the vapor exhaust passage 10 to act on the internal pressure control valve 12 and the vapor exhaust control valve 13. At this time, the opening pressure of the vapor exhaust control valve 13 with respect to the pressure in the fuel storage portion 2 is much lower than even the opening pressure of the internal pressure control valve 13, so the vapor exhaust control valve 13 opens and, as a result, the fuel vapor produced in the fuel storage portion 2 is sent through the second vapor exhaust passage 10b into the charcoal canister 14.

When the refueling is ended, the fuel nozzle is pulled out. At this time, the opening at the bottom end of the guide member 17 once again is closed by the fuel vapor outflow cut-off valve 19. Next, the fuel cap 5 is attached, then the fuel tank lid opener 25 is operated to close the fuel tank lid 24. At this time, the pressure of the space portion 9 in the fuel storage container 1 becomes the atmospheric pressure. Further, since there is unavoidable slight leakage in the fuel vapor outflow cut-off valve 19, after the fuel cap 5 is attached, the pressures of the upper chamber 13b and lower chamber 13c of the vapor exhaust control valve 13 normally become substantially equal. Accordingly, when the fuel cap 5 is once attached, the vapor exhaust control valve 13 is held in the closed state.

When the engine is operated and the fuel in the fuel storage portion 2 is decreased, the fuel storage portion 2 in the stretchable film 3 contracts. When the fuel storage portion 2 contracts, the pressure of the space portion 9 in the fuel storage container 1 falls, but if the pressure in the space portion 9 becomes less than atmospheric pressure, the atmospheric pressure relief valve 28 will be open, so the pressure in the space portion 9 will not fall below the atmospheric pressure. On the other hand, if the fuel temperature in the fuel storage portion 2 rises, the pressure in the fuel storage portion 2 will rise. At this time, if the pressure in the fuel storage portion 2 becomes higher than the opening pressure of the internal pressure control valve 12, the internal pressure control valve 12 will open and therefore the fuel vapor produced in the fuel storage portion 2 will pass through the vapor exhaust passage 10 and the first vapor exhaust passage 10a to be sent into the charcoal canister 14. Next, the fuel vapor will be adsorbed by the activated carbon in the activated carbon layer 15.

On the other hand, if the fuel temperature in the fuel storage portion 2 becomes higher and the pressure in the fuel storage portion 2 rises, the fuel storage portion 2 in the stretchable film 3 will expand and therefore the pressure of the space portion 9 in the fuel storage container 1 will rise as well.

That is, in the embodiment shown in FIG. 1, the pressure inside the fuel storage portion 2 and the pressure of the space portion 9 in the fuel storage container 1 become substantially equal pressures at all times, so if the pressure in the fuel storage portion 2 rises, the pressure in the space portion 9 will rise along with it. In this case, as explained above, since the opening pressure of the positive pressure relief valve 27 is higher than the opening pressure of the internal pressure control valve 12 and the pressure inside the fuel storage portion 2 rises to the opening pressure of the internal pressure control valve 12 at the maximum, the pressure of the space portion 9 also rises at the most to the opening pressure of the internal pressure control valve 12.

In this way, the pressure of the space portion 9 rises at most to the opening pressure of the internal pressure control valve 12 and even when falling to its minimum becomes the atmospheric pressure. Accordingly, the pressure of the space portion 9 is always held to at least the atmospheric pressure. To reduce the amount of the fuel vapor produced in the fuel storage portion 2, however, it is necessary to reduce as much as possible the volume of the space formed above the surface of the liquid fuel in the fuel storage portion 2, that is, the volume of the space in the fuel storage portion 2 which is filled by saturated fuel vapor in accordance with the temperature at that time. In the embodiment shown in FIG. 1, however, if the temperature of the fuel storage portion 2 rises and the fuel storage portion 2 expands, the pressure in the space portion 9 rises along with it. As a result, the expansion of the fuel storage portion 2 is restrained, that is, the fuel storage portion 2 can no longer expand that much, and therefore the increase of the volume of the space formed above the surface of the liquid fuel in the fuel storage portion 2 is restrained. Accordingly, the amount of the fuel vapor produced in the fuel storage portion 2 is reduced and therefore the charcoal canister 14 can be made smaller in size.

Note that the pressure of the space portion 9, as explained above, is substantially atmospheric pressure even when falling to its lowest extent and the pressure in the fuel storage portion 2 becomes substantially equal to the pressure of the space portion 9, so the pressure in the fuel storage portion 2 will usually never become a negative pressure. Accordingly, the outside air introduction valve 21 attached to the fuel cap 5 opens at abnormal times when for some reason or another a negative pressure is produced in the fuel storage portion 2. Further, to reduce the amount of the fuel vapor produced in the refueling pipe 4, it is preferably to reduce the diameter of the refueling pipe 4 as much as possible to an extent not causing resistance to the flow of fuel supplied at the time of refueling. If the diameter of the refueling pipe 4 is made too small, however, the anti-overfueling valve 11 will end up closing due to the pressure of the supplied fuel before the surface of the liquid fuel rises to the anti-overfueling valve 11. Therefore, to prevent the closing of the anti-overfueling valve 11, the lower portion 4b of the refueling pipe 4 where the anti-overfueling valve 11 is disposed is formed to have a large diameter.

Figure 2:
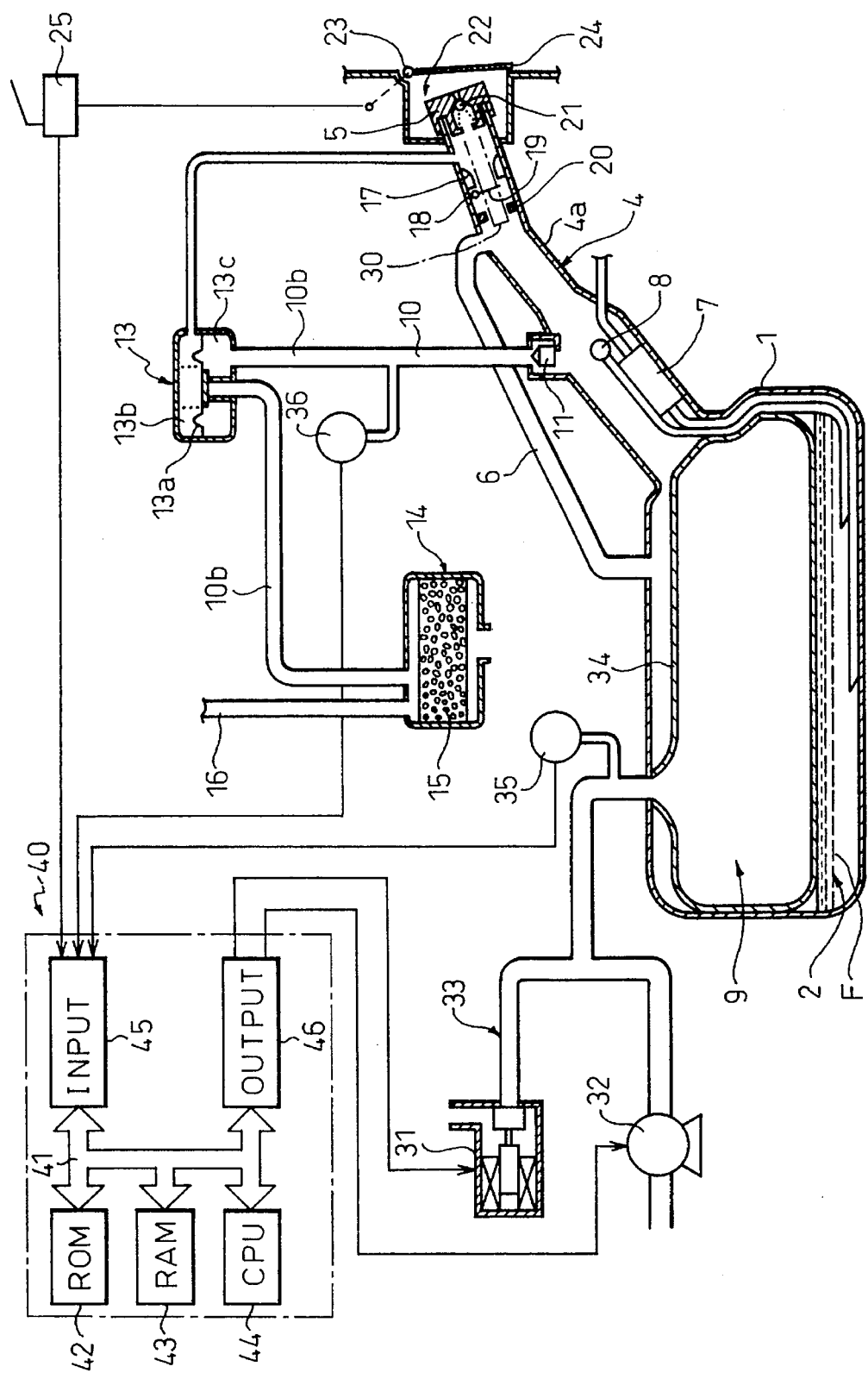
FIG. 2 is a general view of another embodiment of a fuel storing device.

FIG. 2 shows another embodiment. In this embodiment, a bag-shaped stretchable film 34 comprised of a pliable material is disposed in the upper space in the fuel storage container 1. The fuel storage container 1 below the stretchable film 34 is filled with the fuel F. In the stretchable film 34 is formed a space portion 9. The top end of the stretchable film 34 is connected through the conduit 33 to the outside air opening valve 31 on the one hand and to an air compressor 32 on the other hand. When the outside air opening valve 31 is opened, the space portion 9 in the stretchable film 34 becomes atmospheric pressure. On the other hand, if the air compressor 32 is operated in the state when the outside air opening valve 31 is closed, compressed air is supplied to the space portion 9, so the space portion 9 becomes more than atmospheric pressure. In this embodiment, the pressure in the space portion 9 is normally held to at least atmospheric pressure.

The electronic control unit 40 is comprised of a digital computer which is provided with a read only memory (ROM) 42, a random access memory (RAM) 43, a microprocessor (CPU) 44, an input port 45, and an output port 46 connected by a bidirectional bus 41. The input port 45 receives as input the actuation signal of the fuel tank lid opener 25. In the conduit 33 is disposed a first pressure sensor 35 for detecting the pressure Pa of the space portion 9. In the vapor exhaust passage 10 is disposed a second pressure sensor 36 for detecting a pressure Pf in the fuel storage portion 2. The output signals of the first pressure sensor 35 and second pressure sensor 36 are input to the input port 45. On the other hand, the output port 46 is connected to the outside air opening valve 31 and air compressor 32.

In the embodiment shown in FIG. 2, the outside air opening valve 31 and air compressor 32 constitute a regulating apparatus. Further, in this embodiment too, the fuel storage portion 2 and the space portion 9 are separated by the stretchable film 34. Further, in this embodiment, a fuel pump 7 and a pressure regulator 8 are disposed in the refueling pipe 4 so as not to obstruct the expansion and contraction operation of the stretchable film 34.

Figure 3:
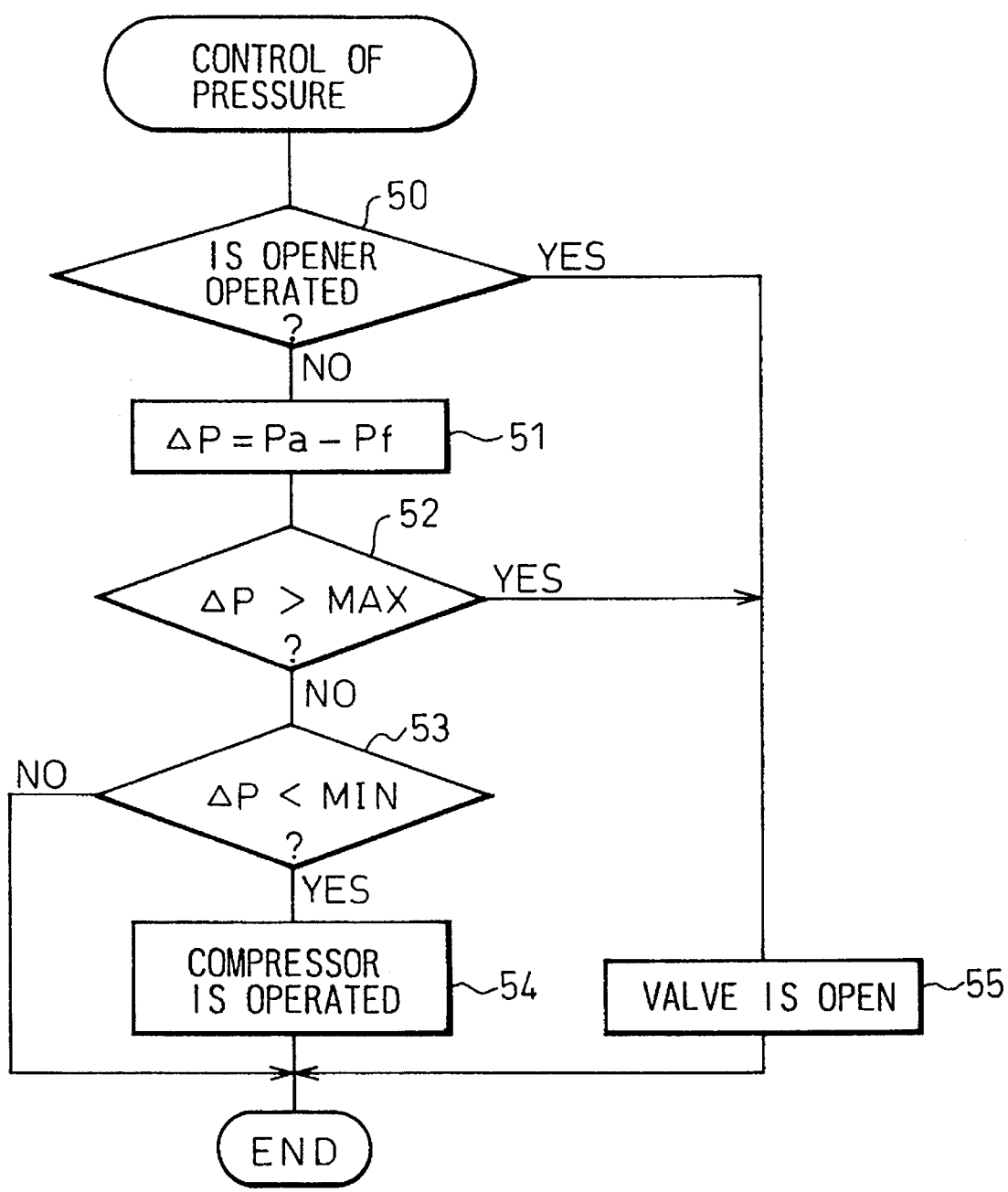
FIG. 3 is a flow chart for controlling pressures in the fuel storage portion and the space portion.

FIG. 3 shows the routine for controlling the pressure in the fuel storage portion 2 and the space portion 9. This routine is executed for example by interruption at predetermined intervals. Note that the outside air opening valve 31, as illustrated in FIG. 2, is normally closed and the air compressor 32 is normally stopped. Further, the electronic control unit shown in FIG. 2 is made to operate even while the engine is stopped.

Referring to FIG. 3, at step 50, it is judged if the fuel tank lid opener 25 is actuated or not. If the fuel tank lid opener 25 is actuated, the routine proceeds to step 55, where an atmospheric pressure opening valve 55 is opened. Accordingly, at this time, the space portion 9 becomes the atmospheric pressure and the stretchable film 34 shrinks along with the supply of fuel in the fuel storage container 1.

As opposed to this, when the fuel tank lid opener 25 has not been actuated, that is, when not refueling, the routine proceeds to step 51, where the pressure difference ΔP (Pa–Pf) between the pressure Pa of the space portion 9 and the pressure Pf of the fuel storage portion 2 is calculated. Next, at step 52, it is judged if the pressure difference ΔP is larger than the predetermined maximum value MAX. When ΔP>MAX, the routine proceeds to step 55, where the outside air opening valve 31 is opened, whereby the pressure Pa of the space portion 9 is lowered. As opposed to this, when ΔP≦MAX, the routine proceeds to step 53, where it is judged if the pressure difference ΔP is smaller than a predetermined minimum value MIN (<MAX). When ΔP<MIN, the routine proceeds to step 54, where the air compressor 32 is actuated, whereby the pressure Pa of the space portion 9 is raised. On the other hand, when ΔP≧MIN, the processing cycle is ended.

Accordingly, in this embodiment, control is exercised so that the pressure difference ΔP becomes between MIN and MAX. That is, control is exercised so that the pressure Pa of the space portion 9 becomes larger than the pressure Pf of the fuel storage portion 2 by a certain value (MIN to MAX). Therefore, the production of fuel vapor is restrained.

Figure 4:
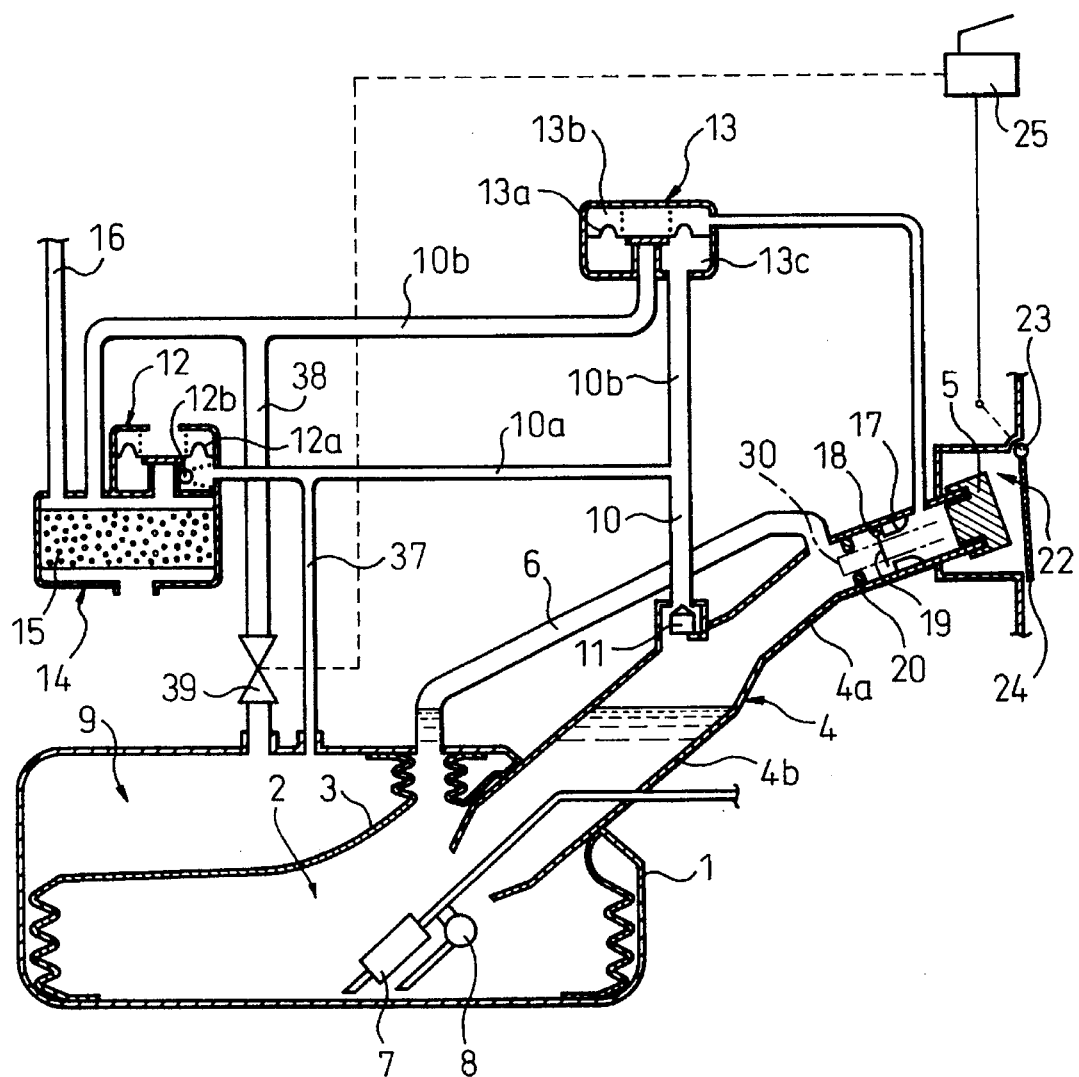
FIG. 4 is a general view of a further embodiment of a fuel storing device.

FIG. 4 shows a still further embodiment. In this embodiment, the space portion 9 in the fuel storage container 1 is on the one hand connected through a first fuel vapor passage 37 to a first vapor exhaust passage 10a and on the other hand through a second fuel vapor passage 38 to a second vapor exhaust passage 10b. The second fuel vapor passage 38 has a flow area larger than the first fuel vapor passage 37. An opening control valve 39 is disposed in the second fuel vapor passage 38. This opening control valve 39 is controlled in accordance with the operation of the fuel tank lid opener 25. When the fuel tank lid opener 25 is operated so as to open the fuel tank lid 24, the opening control valve 39 is opened. Accordingly, this opening control valve 39 is held in a closed state other than at the time of refueling. Further, in this embodiment, the internal pressure control valve 12 is provided with a check valve 12b which opens when the pressure inside the charcoal canister 14 becomes higher than the pressure in the first vapor exhaust passage 10a, that is, which opens when the fuel storage portion 2 and the space portion 9 become negative pressure.

If the stretchable film 3 is formed from rubber, however, the fuel vapor produced in the fuel storage portion 2 is liable to pass through the stretchable film 3 and flow out into the space portion 9. Further, even when the stretchable film 3 is formed from a fluororesin or fluororubber which is resistant to permeation by fuel vapor, the fuel vapor is liable to pass through the stretchable film 3 and flow out into the space portion 9. In this embodiment, even if the fuel vapor flows out into the space portion 9, the fuel vapor will be sent into the charcoal canister 14, so there is no risk of the fuel vapor being discharged into the outside air.

That is, in this embodiment too, when refueling, first the fuel tank lid opener 25 is operated to open the fuel tank lid 24. When the fuel tank lid opener 25 is operated, the opening control valve 39 is made to open. Next, when the refueling is started, the fuel in the fuel storage portion 2 increases and, along with this, the fuel storage portion 2 expands. At this time, the opening control valve 39 is open, so the fuel storage portion 2 can freely expand. Further, at this time, the fuel vapor in the space portion 9 is sent through the second fuel vapor passage 37 to the inside of the charcoal canister 14. Accordingly, at this time, the fuel vapor in the space portion 9 is prevented from being discharged into the outside air.

Next, when the refueling has been completed, the fuel nozzle is pulled out, then the fuel cap is attached. Next, the fuel tank lid opener 25 is operated to close the fuel tank lid 24. At this time, the opening control valve 39 is made to close. At this time, the pressure in the space portion 9 of the fuel storage container 1 becomes atmospheric pressure. Next, when the engine is started to be operated and the fuel in the fuel storage portion 2 is reduced, the fuel storage portion 2 contracts. When the fuel storage portion 2 contracts, the pressure in the fuel storage portion 2 and the pressure in the space portion 9 fall, but if the pressure in the fuel storage portion 2 and the pressure in the space portion 9 start to fall below the atmospheric pressure, the check valve 12b opens, so the pressure in the fuel storage portion 2 and the pressure in the space portion 9 will not fall below the atmospheric pressure.

On the other hand, when the fuel temperature in the fuel storage portion 2 rises, the pressure in the fuel storage portion 2 rises and, at this time, the pressure in the space portion 9 rises as well. Next, if the pressure in the fuel storage portion 2 and the pressure in the space portion 9 become higher than the opening pressure of the internal pressure control valve 12, the internal pressure control valve 12 opens. If the internal pressure control valve 12 opens, on the one hand the fuel vapor in the fuel storage portion 2 is sent through the first vapor exhaust passage 10a to the charcoal canister 14, while on the other hand the fuel vapor in the space portion 9 is sent through the first fuel vapor passage 37 into the charcoal canister 14. Accordingly, at this time as well, the fuel vapor in the fuel storage portion 2, of course, and also the fuel vapor in the space portion 9 are prevented from being discharged into the outside air.

On the other hand, in the embodiment shown in FIG. 2, the pressure in the fuel storage portion 2 and the pressure in the space portion 9 rise at the most to the opening pressure of the internal pressure control valve 12 and even when falling to the lowest extent become atmospheric pressure. Accordingly, the pressure in the fuel storage portion 2 and the pressure in the space portion 9 are held constantly at least at the atmospheric pressure. Therefore, the amount of the fuel vapor produced in the fuel storage portion 2 can be reduced and therefore the charcoal canister 14 can be made smaller in size.

While the invention has been described by reference to specific embodiments chosen for purposes of illustration, it should be apparent that numerous modifications could be made thereto by those skilled in the art without departing from the basic concept and scope of the invention.

I claim:

1. A fuel storing device for a motor vehicle comprising:

a fuel storage container;

a pliable stretchable film disposed in said fuel storage container and separating the inside of said fuel storage container into a fuel storage portion and a space portion;

a refuel pipe connected to said fuel storage portion; and pressure regulating means able to hold the pressure of the space portion at a pressure higher than atmospheric pressure.

2. A fuel storing device according to claim 1, wherein said pliable stretchable film forms a bag-shape, said fuel storage portion is formed inside the bag-shaped stretchable film, and said space portion is formed in said fuel storage container at the outside of said bag-shaped stretchable film.

3. A fuel storing device according to claim 1, wherein said pliable stretchable film forms a bag-shape, said space portion is formed inside the bag-shaped stretchable film, and said fuel storage portion is formed in said fuel storage container at the outside of said bag-shaped stretchable film.

4. A fuel storing device for a motor vehicle comprising:
   a fuel storage container;
   a pliable stretchable film disposed in said fuel storage container and separating the inside of said fuel storage portion and a space portion;
   a refuel pipe connected to said fuel storage portion; and
   pressure regulating means able to hold the pressure of the space portion at a pressure higher than atmospheric pressure;
   wherein said pressure regulating means causes said space portion to communicate with the outside air when the pressure of said space portion becomes higher than a predetermined positive pressure or when the pressure of said space portion becomes lower than atmospheric pressure, and said pressure regulating means cuts the communication between said space portion and outside air when the pressure of said space portion becomes higher than the atmospheric pressure and lower than said predetermined positive pressure.

5. A fuel storing device according to claim 4, wherein said pressure regulating means is comprised of a positive pressure relief valve and atmospheric pressure relief valve disposed in parallel between said space portion and the outside air, said positive pressure relief valve opens when the pressure of said space portion becomes higher than said predetermined positive pressure, and said atmospheric pressure relief valve opens when the pressure of said space portion becomes lower than the atmospheric pressure.

6. A fuel storing device according to claim 5, wherein the device comprises a charcoal canister accommodating activated carbon and an internal pressure control valve which opens when the pressure in said fuel storage portion exceeds a predetermined positive pressure higher than the atmospheric pressure to send the fuel vapor in said fuel storage portion into said charcoal canister, and wherein the opening pressure of said positive pressure relief valve is set higher than the opening pressure of said internal pressure control valve.

7. A fuel storing device according to claim 5, wherein said positive pressure relief valve and said atmospheric pressure relief valve are comprised of check valves.

8. A fuel storing device according to claim 1, wherein said pressure regulating means makes the pressure of said space portion higher than the pressure of said fuel storage portion by a predetermined range of pressure.

9. A fuel storing device according to claim 8, wherein said pressure regulating means is provided with an outside air opening valve for opening said space portion to the outside air and a compressed air supplying apparatus for supplying compressed air to said space portion and wherein said pressure regulating means controls said outside air opening valve and said compressed air supplying apparatus to hold the pressure difference between the pressure of said space portion and the pressure inside said fuel storage portion to within said predetermined range.

10. A fuel storing device according to claim 9, wherein said pressure regulating means is provided with a first pressure sensor for detecting the pressure of said space portion and a second pressure sensor for detecting the pressure inside said fuel storage portion and where said pressure difference is calculated based on the output signals of said first pressure sensor and said second pressure sensor.

11. A fuel storing device according to claim 9, wherein said compressed air supplying apparatus is comprised of an air compressor.

12. A fuel storing device for a motor vehicle comprising:
    a fuel storage container;
    a pliable stretchable film disposed in said fuel storage container and separating the inside of said fuel storage portion and a space portion;
    a refuel pipe connected to said fuel storage portion; and
    pressure regulating means able to hold the pressure of the space portion at a pressure higher than atmospheric pressure;
    wherein a charcoal canister accommodating activated carbon is provided, and wherein said pressure regulating means makes said space portion communicate with said charcoal canister when the pressure of said space portion becomes higher than a predetermined positive pressure higher than the atmospheric pressure, and said pressure regulating means cuts the communication between said space portion and said charcoal canister when the pressure of said space portion becomes lower than said predetermined positive pressure.

13. A fuel storing device according to claim 12, wherein said pressure regulating means is comprised of an internal pressure control valve which is disposed between said space portion and said charcoal canister and opens when the pressure of said space portion exceeds said predetermined positive pressure.

14. A fuel storing device according to claim 13, wherein said space portion and said fuel storage portion are made to communicate with each other outside of said fuel storage container.

15. A fuel storing device according to claim 1, wherein the device comprises an outside air opening valve which opens said space portion to the outside air when supplying fuel to the inside of said fuel storage portion.

16. A fuel storing device according to claim 15, wherein a charcoal canister accommodating activated carbon is provided, and said outside air opening valve is disposed between said space portion and said charcoal canister.

17. A fuel storing device according to claim 1, wherein the device comprises an outside air introduction valve which opens when the pressure in said fuel storage portion becomes lower than a predetermined negative pressure lower than the atmospheric pressure to introduce outside air into said fuel storage portion.

18. A fuel storing device according to claim 1, wherein the device comprises an outside air introduction valve which opens when the pressure inside said fuel storage portion and said space portion becomes lower than a predetermined negative pressure lower than atmospheric pressure to introduce outside air into said fuel storage portion and said space portion.

* * * * *